United States Patent
Lenoir

(10) Patent No.: US 11,619,456 B2
(45) Date of Patent: Apr. 4, 2023

(54) FLOW MIXER DUCT FOR A BLEED SYSTEM

(71) Applicant: Airbus Operations, S.L.U., Getafe (ES)

(72) Inventor: Brice Lenoir, Getafe (ES)

(73) Assignee: AIRBUS OPERATIONS S.L.U., Getafe (ES)

( * ) Notice: Subject to any disclaimer, the term of this patent is extended or adjusted under 35 U.S.C. 154(b) by 331 days.

(21) Appl. No.: 16/830,425

(22) Filed: Mar. 26, 2020

(65) Prior Publication Data
US 2020/0363142 A1    Nov. 19, 2020

(30) Foreign Application Priority Data

Apr. 3, 2019   (EP) ..................................... 19382243

(51) Int. Cl.
| | | |
|---|---|---|
| *F28F 1/14* | (2006.01) | |
| *B64D 33/08* | (2006.01) | |
| *F02C 7/14* | (2006.01) | |
| *F02C 9/18* | (2006.01) | |

(52) U.S. Cl.
CPC ................ *F28F 1/14* (2013.01); *B64D 33/08* (2013.01); *F02C 7/14* (2013.01); *F02C 9/18* (2013.01); *F05D 2220/323* (2013.01); *F05D 2250/25* (2013.01); *F05D 2260/213* (2013.01); *F28F 2210/10* (2013.01)

(58) Field of Classification Search
CPC ... B64D 33/08; F02C 6/08; F02C 7/14; F02C 9/18; F01D 9/06; F01D 9/065; F05D 2250/25; F05D 2260/213; F28F 1/14; F28F 2210/10
See application file for complete search history.

(56) References Cited

U.S. PATENT DOCUMENTS

| | | | |
|---|---|---|---|
| 5,581,996 A | * | 12/1996 | Koch ..................... F02C 7/185 60/785 |
| 10,337,334 B2 | | 7/2019 | Spangler et al. |
| 2017/0159567 A1 | * | 6/2017 | Spangler .................. F01D 5/18 |
| 2018/0328285 A1 | | 11/2018 | Tajiri et al. |

FOREIGN PATENT DOCUMENTS

| | | |
|---|---|---|
| EP | 3026384 A2 | 6/2016 |
| EP | 3181820 A1 | 6/2017 |
| EP | 3401629 A1 | 11/2018 |

OTHER PUBLICATIONS

European Search Report; priority document.

* cited by examiner

*Primary Examiner* — Scott J Walthour
(74) *Attorney, Agent, or Firm* — Greer, Burns & Crain, Ltd.

(57) ABSTRACT

A duct for a bleed system of an aircraft, wherein the duct extends from an inlet section to an outlet section along a longitudinal axis, and wherein the duct comprises a continuous piece arranged on and protruding from the internal wall of the duct. The duct is subject to temperature gradients in order to reduce the temperature of the warmest airflow closer to the inner wall rather than rapidly mix the airflow.

12 Claims, 7 Drawing Sheets

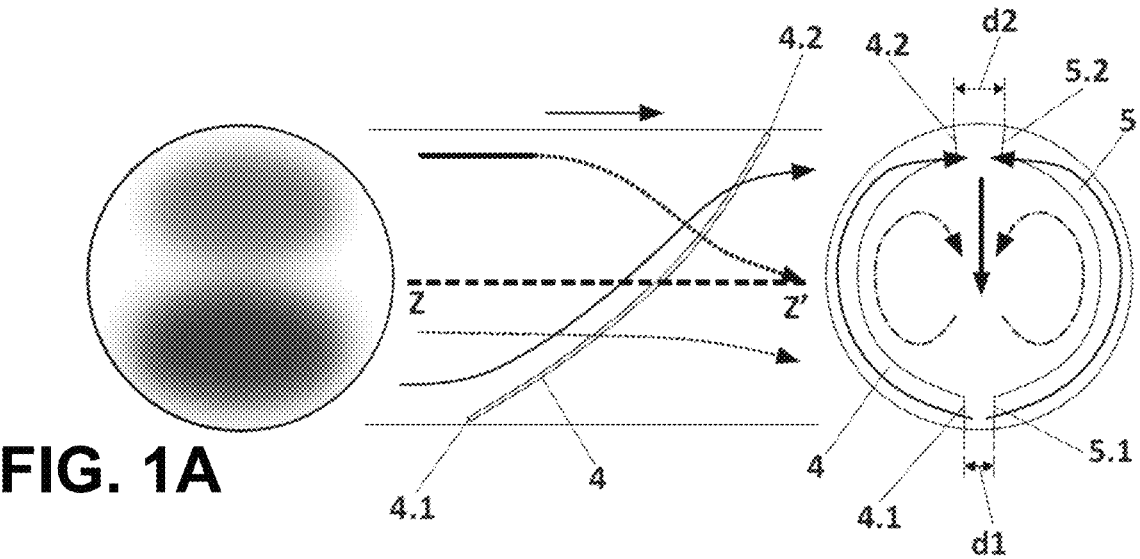
FIG. 1A  FIG. 1B  FIG. 1C
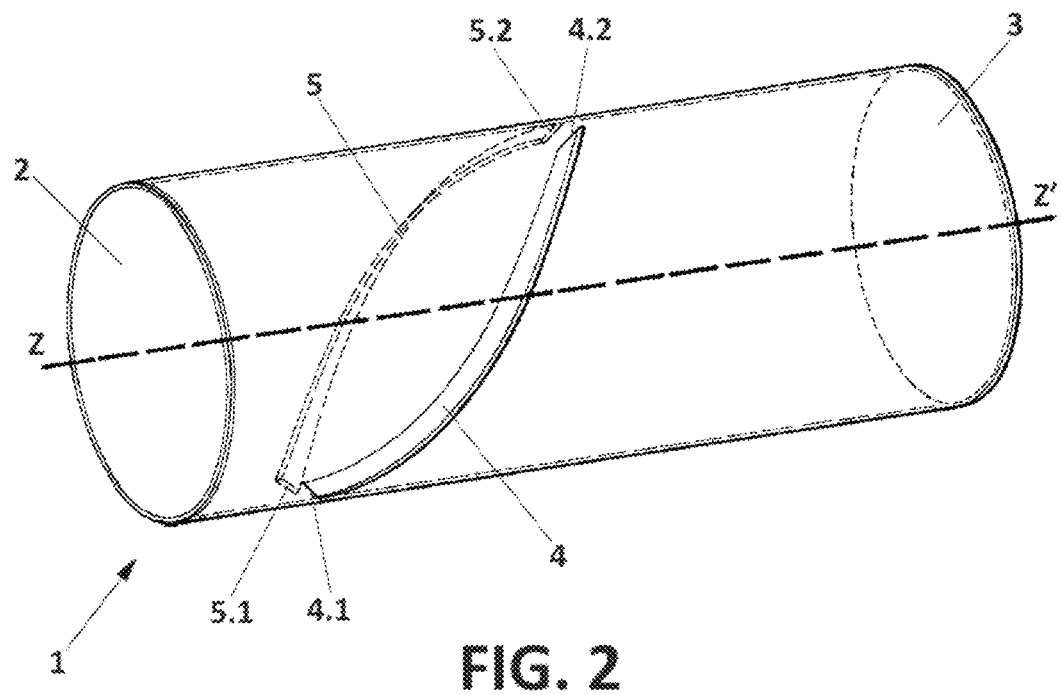
FIG. 2

FLOW MIXER DUCT FOR A BLEED SYSTEM

CROSS-REFERENCES TO RELATED APPLICATIONS

This application claims the benefit of the European patent application No. 19382243.4 filed on Apr. 3, 2019, the entire disclosures of which are incorporated herein by way of reference.

FIELD OF THE INVENTION

The present invention belongs to the field of air systems, and particularly, it belongs to the field of protecting ducts working under high temperature gradients in an aircraft.

More particularly, the invention provides a duct with an inner featured wall which promotes reducing the temperature of the warmest airflow closer to the inner wall rather than rapidly mix the airflow if such incoming airflow has high temperature gradient.

BACKGROUND OF THE INVENTION

In gas turbine engines, air is normally taken from the compressor stage upstream of the fuel-burning chamber(s). Thus, this bleed air is at high temperature and high pressure, wherein typical values of temperature are comprised in the range 200-500° C. when extracted from the engine, and in the range 200-250° C. after regulation in a precooler, and typical values of pressure is 275 kPa. Once taken, this bleed air is channeled from the compressor stages of the engine to various locations within the aircraft, by a network of ducts, valves and regulators. Consequently, such channeling means are adapted to withstand the high temperature and pressure of the bleed air.

To cool down the bleed air, thermal exchangers are normally used in the pylons, which separately run hot bleed air from the engine, and ram air from outside. The high temperature difference between both sides of the thermal exchanger entails that the cooled bleed airflow exiting the hot side of the thermal exchanger and passing to the duct for channeling, has an inadequate temperature gradient.

The temperature gradient of this exiting airflow ranges from around 400K in the coolest spot up to 650K in the hottest spot.

Consequently, at the foremost section of the duct facing such temperature gradient, a portion of the duct is subject to very high temperature not withstandable by most of common materials. Therefore, before the airflow can mix itself, either the duct or any other affected element of the bleed system (inter alia, pipes, seals or bellows) may undergo a degradation of their mechanical properties.

Typical materials, such as titanium, have been used in zones where temperature stays below 530K approx., but this temperature gradient issue makes locally inviable the use of such materials.

To solve this problem, some solutions have been implemented over the last years for applications working under tight pressure-loss constraints, but none has provided satisfactory results in terms of low enough pressure loss not only in normal flow direction but also operating with reverse flow, e.g., engine start operations.

A promising solution due to its simplicity and effectiveness was the use of high-temperature resistant materials (such as Inconel material) in duct parts directly downstream of the thermal exchanger rather than using titanium. Since no device perturbs the air flowing through the duct, no pressure loss was added. Nevertheless, disadvantageously, Inconel material is significantly less economic as well as heavier than titanium. Also, since no device is provided to accelerate airflow mixing, temperature sensors have to be installed at a greater distance, which is unacceptable for some equipment.

On the other hand, other solutions lie with the idea of interposing mixing devices in order to rapidly mix the airflow and decrease maximum temperature as the air flows by. Typical examples are fixed mixing devices with propeller-shapes.

Due to their inherent impact in pressure loss, these mixing devices affect the overall performance of the bleed system. Because of the advent of new aircraft models which try to be more efficient, the bleed systems do not usually have enough pressure margin so as to offset the losses of the ducts.

Other static mixing devices have also been attempted, different in shape and arrangement from the propeller-shaped ones. For instance, other static mixing devices may be the arrangement of aerodynamic airfoils in the warmest sector of the airflow at the beginning of the duct to induce the hot air to be directed towards the cold sector and avoid thereby prompt contact of that hot air with the duct. Theoretically these static mixing devices, as explained, may not try to completely mix the flow, but to lower down the warmest part thereof and initiate turbulence for a faster mixing downstream.

Unfortunately, computational modelling and real-life tests have both shown that this solution has very low effect, apart from creating turbulence which will entail additional pressure loss, due to the manufacturing constraints of creating efficient airfoils staying within the cross-section of the duct.

Accordingly, there is a need in the aeronautical industry to control the high temperature gradient in a duct arranged right at the outlet of the hot side of a thermal exchanger, with the proviso that pressure loss is kept down, as well as typical aeronautical requirements such as low weight and costs are met.

SUMMARY OF THE INVENTION

In a first inventive aspect, the invention provides a duct for a bleed system of an aircraft, wherein the duct extends at least partially along a longitudinal axis, the duct comprising:

an inlet section for entering a fluid flow into the duct;

an outlet section distanced from the inlet section, through which such fluid flow exits the duct; and at least one continuous piece arranged on the internal wall of the duct and protruding therefrom, the at least one continuous piece having:

a first end located at a position adjacent to the inlet section and a second end located at a position close to the outlet section, wherein the continuous piece slantly extends from the first end to the second end along the longitudinal axis direction of the duct so that first and second ends are substantially opposed in transversal cross-section of the duct.

Throughout this entire document, 'duct' can be understood as a duct itself or a portion thereof in the sense of a bodily tube or vessel for carrying fluids, preferably gases, of the type of a pipe, tube, or channel.

Preferably, the longitudinal axis is the longitudinal directrix of the duct.

In use, fluid flow with a temperature gradient enters into the duct by the inlet section. The inlet section receives the airflow with the temperature gradient, a cold and hot sector being defined thereon depending on the relative temperature of the incoming flow. Normally, each sector has a semi-area of the inlet section. In turn, the outlet section allows that the fluid flow exits the duct.

Under such configuration, the first end of the at least one continuous piece, placed adjacent to the inlet section, is actually arranged adjacent to the cold sector of the inlet section, the at least one continuous piece slantly advancing along the longitudinal axis direction of the duct up to the second end close to the outlet section. As a result, a portion of the airflow is therefore deflected in such a manner that the temperature gradient at the outlet section is lower than at the inlet section.

A portion of the cold airflow is deflected towards the warmest zone of the duct. Consequently, the cold airflow guided to the warmest zone naturally drives the hot air towards the center of the duct, creating a vortex. Therefore, such hot air contacting the duct is drawn to the center (that is, inwards to the directrix of the duct) reducing the temperature of the warmest airflow closer to the inner wall.

The continuous piece has a shape small enough compared with the transversal cross-section which attains only deflecting the incoming airflow rather than throttling it. Also, as it is placed along the duct surface (where the flow speed is reduced because of the boundary layer), the pressure loss is minimized.

Therefore, the duct according to the invention has lower pressure loss (i.e., better performance) compared to state-of-art mixing devices.

Advantageously, the continuous piece arranged on the inner wall of the duct is both economic and simple to manufacture, since it does not rely on complex curvatures of blades or airfoils, and tight welds.

Furthermore, the created vortex supports the complete flow mixing at shorter distance downstream. Thus, temperature sensors can be placed at reduced distance and the duct needs not to have an excessive length.

In an embodiment, the duct comprises at least two continuous pieces arranged on the internal wall of the duct.

In an embodiment, the duct comprises two continuous pieces symmetrically arranged on the internal wall of the duct relative to the middle plane crossing by the longitudinal axis from up to bottom of the duct (that is, the vertical middle plane), the first ends of the continuous pieces being separated a first predetermined distance, and the second ends of the continuous pieces being separated a second predetermined distance.

In use, when fluid flow with a temperature gradient enters into the duct by the inlet section, the bottom end of the duct corresponds to the coldest end in the cold sector while the upper end corresponds to the warmest end in the hot sector.

As mentioned, the continuous pieces extend from the cold zone of the duct towards the warmest zone, following the flow direction. Preferably, the continuous pieces do not extend completely along the inner perimeter of the duct in order not to locally impinge the airflow.

Because of symmetry of the continuous pieces, the created vortex is more effective recirculating the airflow. The cold air raised to the warmest zone of the duct protects the metal surface from high temperature in a shorter distance.

In an embodiment, the first predetermined distance is greater than the second predetermined distance.

The more distanced the first ends are arranged (that is, the greater the first distance is), the less the pressure loss will be.

In an embodiment, at least two of the continuous pieces are arranged on the internal face of the duct staggered relative to the longitudinal axis, each continuous piece starting at a different position of the longitudinal axis.

In an embodiment, the duct is substantially cylindrical at least along a portion of the duct. In an embodiment, the at least one continuous piece has a helical shape on the internal face of the cylindrical duct.

In an embodiment, at least one of the continuous pieces has three portions:
a first portion starting at the first end,
a second portion between the first and a third portion, and
the third portion ending at the second end.

In an embodiment, each portion of the continuous piece has a different tilting degree in relation to the longitudinal axis.

Throughout the entire description, the tilting degree of each portion should be understood as the angle formed with the longitudinal axis of the duct.

In an embodiment, the first and third portions are less tilted in relation to the longitudinal axis than the second portion.

In an embodiment, the first and third portions are substantially parallel to the longitudinal axis of the duct.

So that, in this embodiment, the continuous piece has substantially round connections between respective portions.

In an embodiment, the at least one continuous piece is a substantially elongated thin piece. That is, its thickness is much less than any of the other dimensions (width and height).

In an embodiment, the at least one continuous piece is angled different from 90° with respect to the inner wall of the duct. In an embodiment, the angle between the at least one continuous piece and the inner wall of the duct varies along its path.

Accordingly, the at least continuous piece has a torsion along its path. This configuration advantageously entails a more effective energization of the vortex, which causes the hot air to be pushed away from the internal wall of the duct.

In an embodiment, the duct portion adjacent to the outlet section is made of titanium. That is, unlike state-of-art solutions which attempt to use Inconel material to protect from degradation, the duct according to the present invention still has the capacity to withstand such a high temperature even made of titanium close to the outlet section thereof.

Further, the rest of the duct may be made of Inconel, for instance. Similarly, afterwards the outlet section of the duct, the appended subsequent duct may be made of titanium.

In a second inventive aspect, a bleed system for an aircraft comprises:
a heat exchanger with a cold side and a hot side, the hot side comprising an inlet and an outlet, and the cold side comprising an inlet and an outlet; and
a duct according to any of the embodiments of the first inventive aspect;
wherein the hot side outlet is in fluid communication with the inlet section of the duct.

In an embodiment the heat exchanger separates cold and hot sides by fins and walls.

In a third inventive aspect, the invention provides an aircraft which comprises the bleed system according to the second inventive aspect.

All the features described in this specification (including the claims, description and drawings) and/or all the steps of the described method can be combined in any combination, with the exception of combinations of such mutually exclusive features and/or steps.

BRIEF DESCRIPTION OF THE DRAWINGS

These and other characteristics and advantages of the invention will become clearly understood in view of the detailed description of the invention which becomes apparent from a preferred embodiment of the invention, given just as an example and not being limited thereto, with reference to the drawings.

FIGS. 1A-C show an embodiment of a duct according to the invention in front, longitudinal section and rear view, respectively.

FIG. 2 shows an embodiment of a duct according to the invention.

DETAILED DESCRIPTION OF THE PREFERRED EMBODIMENTS

Figure 3A:
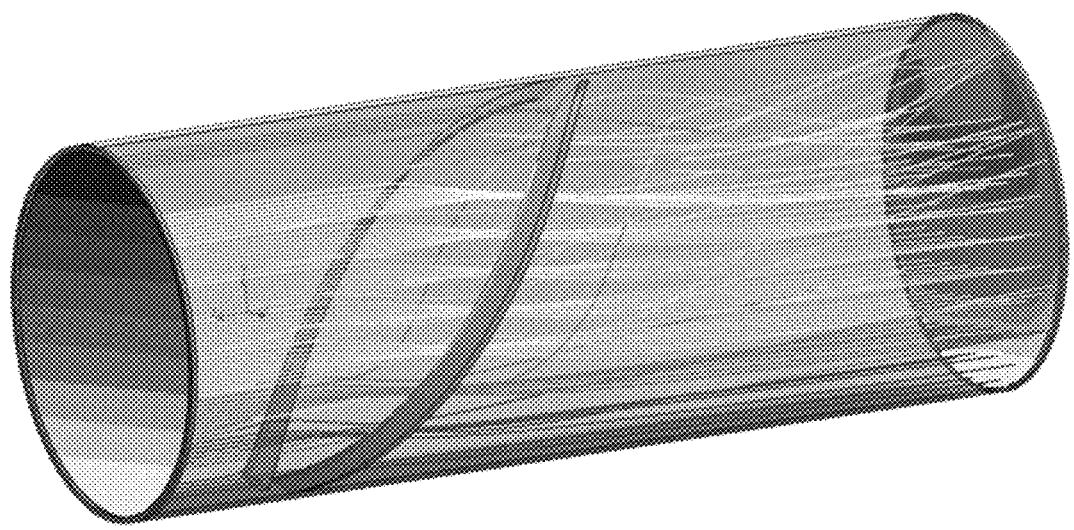
FIGS. 3A-B show the results of CFD analysis performed for the duct according to the embodiment of FIG. 2.

FIGS. 1A-C show an embodiment of a duct for a bleed system of an aircraft according to the invention. In these figures the duct is shown in front, longitudinal section and rear view, respectively.

The duct extends along a longitudinal axis (z-z'), shown in FIG. 1B in dotted line. According to this embodiment, the duct comprises:

an inlet section (2) for entering a fluid flow into the duct (1);

an outlet section (3) distanced from the inlet section (2), through which such fluid flow exits the duct (1); and two continuous pieces (4, 5) arranged on the internal wall of the duct and protruding therefrom;

wherein the continuous pieces have a first end (4.1, 5.1) located at a position adjacent to the inlet section (2) and a second end (4.2, 5.2) located at a position close to the outlet section, and wherein the continuous pieces slantly extend from the first end (4.1, 5.1) to the second end (4.2, 5.2) along the longitudinal axis (z-z') direction of the duct (1) so that first (4.1, 5.1) and second (4.2, 5.2) ends are substantially opposed in transversal cross-section of the duct (1).

In this embodiment the duct is substantially cylindrical. The two continuous pieces (4, 5) are symmetrically arranged on the internal wall of the duct (1) relative to the axis (z-z'). The first ends (4.1, 5.1) of the continuous pieces (4, 5) are separated a first predetermined distance (d1), and the second ends (4.2, 5.2) of the continuous pieces (4, 5) are separated a second predetermined distance (d2), as visible in FIG. 1C. In this embodiment the first predetermined distance (d1) is smaller than the second predetermined distance (d2). However, in other embodiments the first predetermined distance (d1) may be greater than or equal to the second predetermined distance (d2).

FIG. 1A schematically shows the temperature distribution in the duct (1) at a position upstream the continuous pieces (4, 5). A cold air section and a hot air section are clearly distinguished in the figure, where the cold air section occupies the lower portion of the duct and the hot air section occupies the upper portion of the duct.

It is to be noted that "cold" and "hot" terms are used herein not according to the actual temperature of the air, but because of their relative values. A temperature gradient always has a zone, or end, with less temperature (that is, "cold" air), and an opposite zone, or end, with higher temperature (that is, "hot" air), where temperature in zones therebetween gradually varies from one to other value.

The two symmetrical continuous pieces (4, 5) protruding from the internal wall of the duct (1) guide the bottom cold air towards the top portion of the duct (1) along the internal wall. The cold air guided to the top naturally drives the hot air towards the center of the duct (1), and creates a vortex. The created vortex helps the complete flow mixing at a small distance downstream the continuous pieces (4, 5). This is schematically shown in FIGS. 1B and 1C.

Figure 3B:
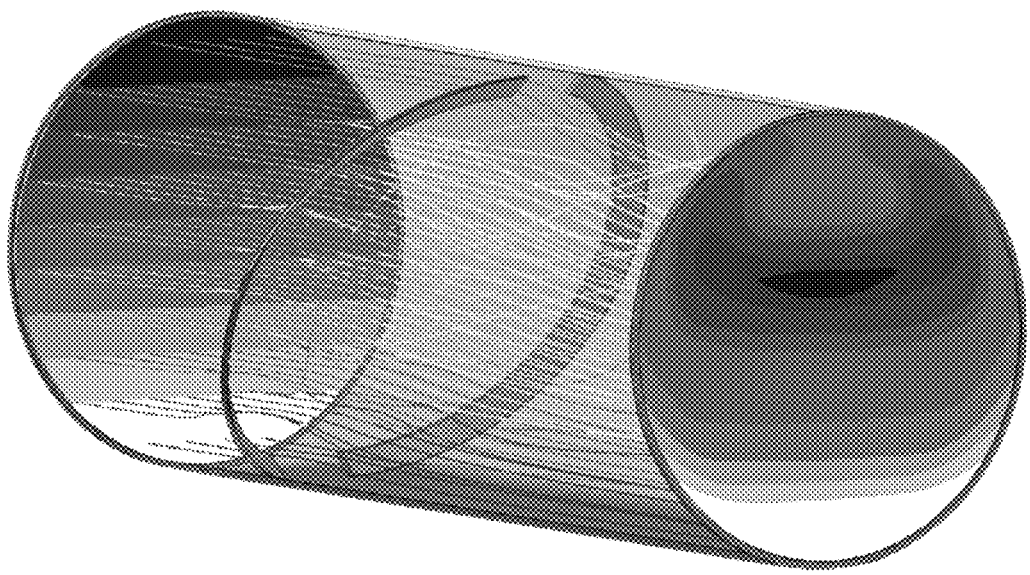

FIGS. 2 and 3A-B show an embodiment of a duct according to the invention in perspective views. In these figures part of the wall of the duct is not represented in order to appreciate the continuous pieces (4, 5) arranged inside the duct.

In this embodiment the duct is substantially cylindrical, the continuous pieces (4, 5) are arranged symmetrically on the internal wall of the duct relative to the axis (z-z') and have a helical shape.

The continuous pieces (4, 5) protruding from the internal wall of the duct may be either built-in or joined by welding.

FIGS. 3A-B show the results of CFD (Computational Fluid Dynamics) analysis performed for the duct according to the embodiment of FIG. 2. The model was made for a duct having a diameter of 4.5 inch (114.3 cm) and 110 mm of maximum length. The temperature distributions at the inlet section (2) and at the outlet section (3) of the duct (1) are visible in FIGS. 3A-B, respectively. It can be seen that the behavior is as explained in connection with FIGS. 1A-C, with the hot air being pushed away from the duct wall and the vortex starting to mix the airflow.

Figure 4:
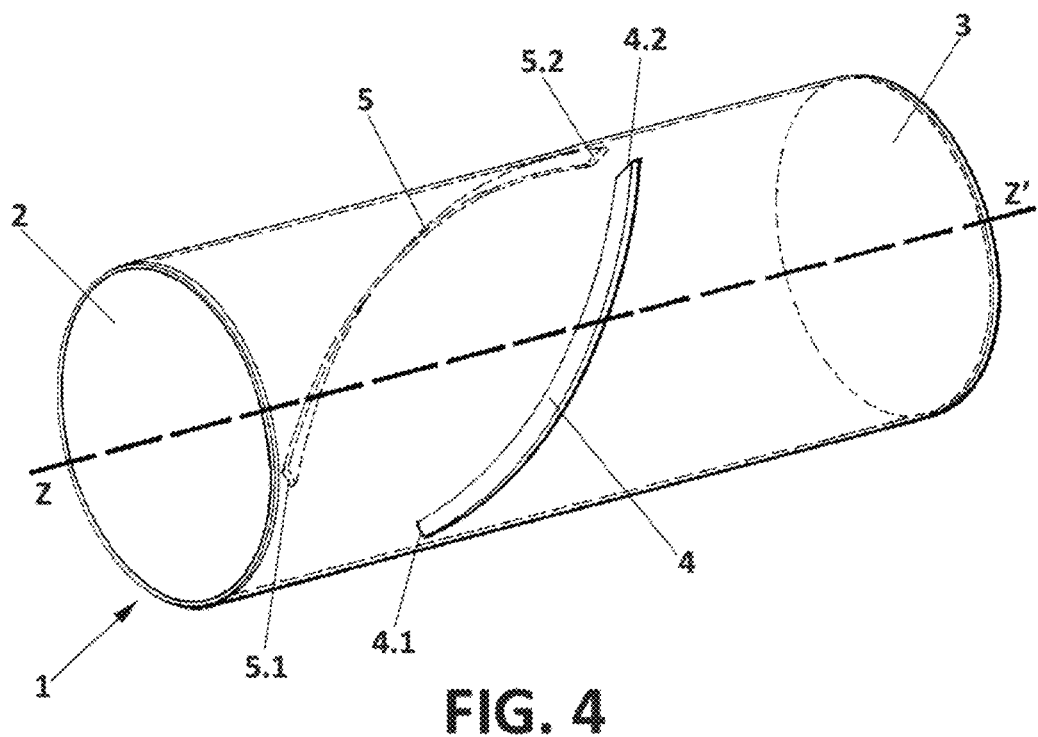
FIG. 4 shows an embodiment of a duct according to the invention.
Figure 5:
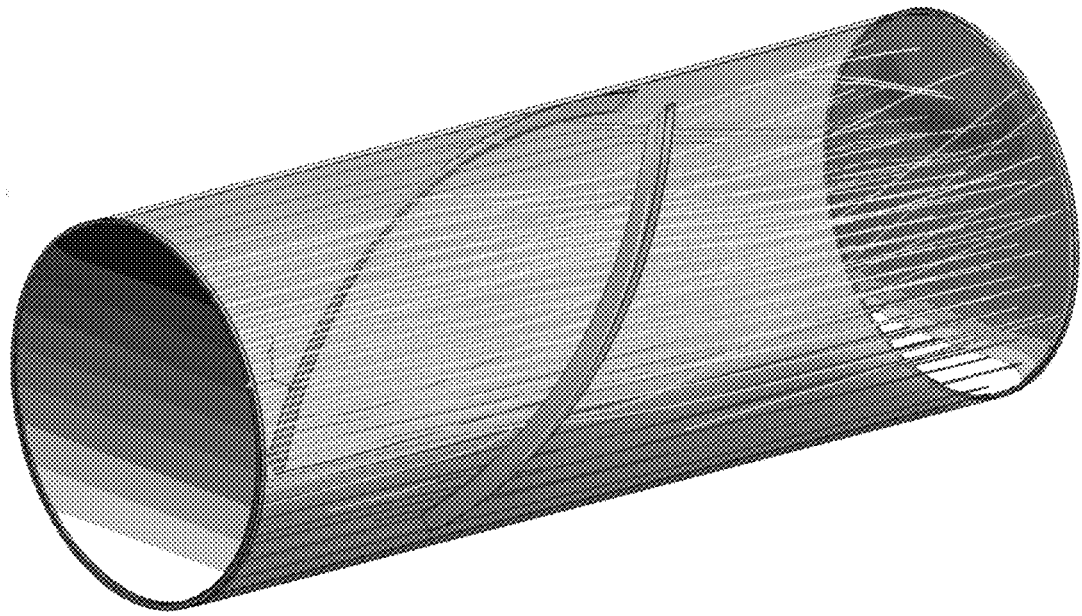
FIG. 5 shows the results of CFD analysis performed for the duct according to the embodiment of FIG. 4.

FIGS. 4 and 5 show another embodiment of a duct according to the invention. This embodiment is a variant of the embodiment of FIGS. 2 and 3A-B, wherein the difference with this embodiment is a greater distance between the first ends (4.1, 5.1) of the continuous pieces (4, 5). This widened distance between the first ends (4.1, 5.1) of the continuous pieces (4, 5) results in reduced effect and pressure loss, as visible in FIG. 5, where the results of a CFD analysis performed for the duct according to the embodiment of FIG. 4 are shown.

The CFD analysis performed for ducts according to the invention shows the ability to reduce a maximum upstream air temperature from 370° C. to less than 290° C. at the surface of the internal wall of the duct, with a pressure loss comparable to the one caused by deflector devices already used in the state of the art.

Figure 6A:
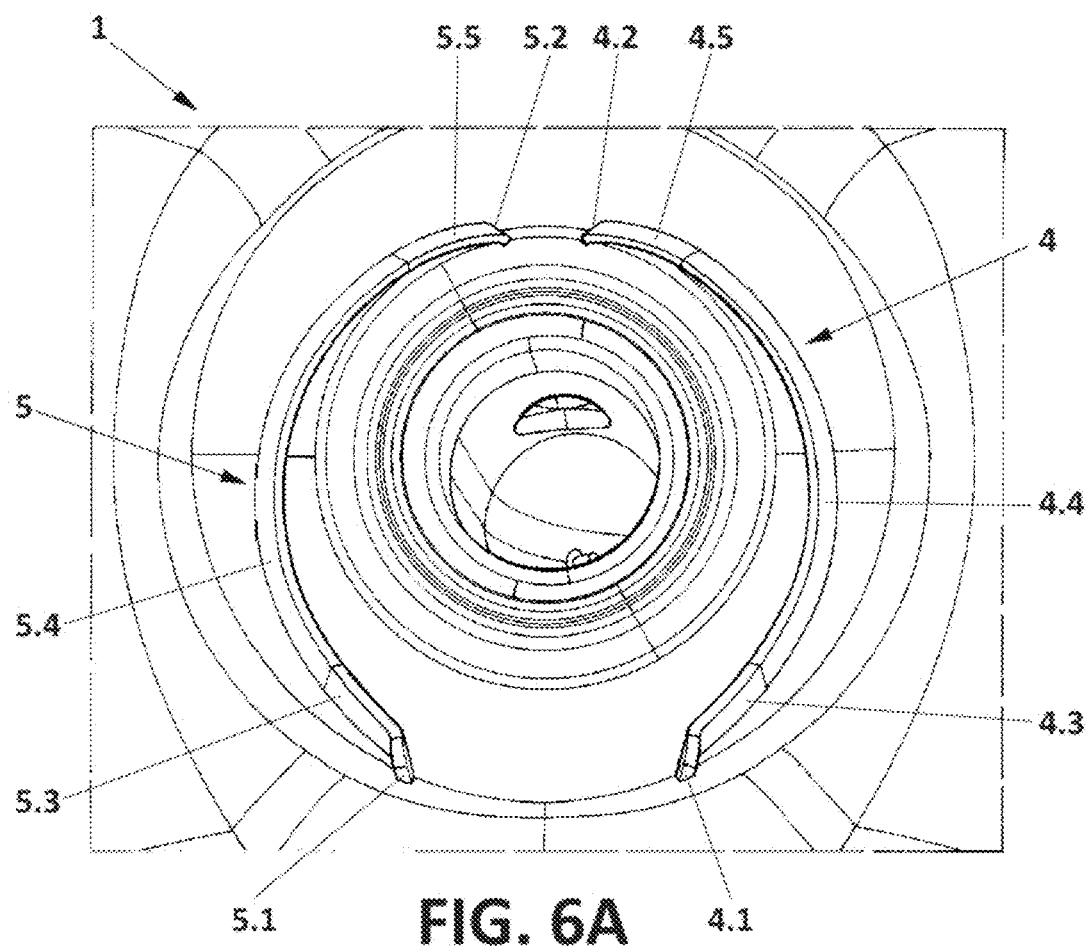
FIGS. 6A-C show another embodiment of a duct according to the invention.
Figure 6B:
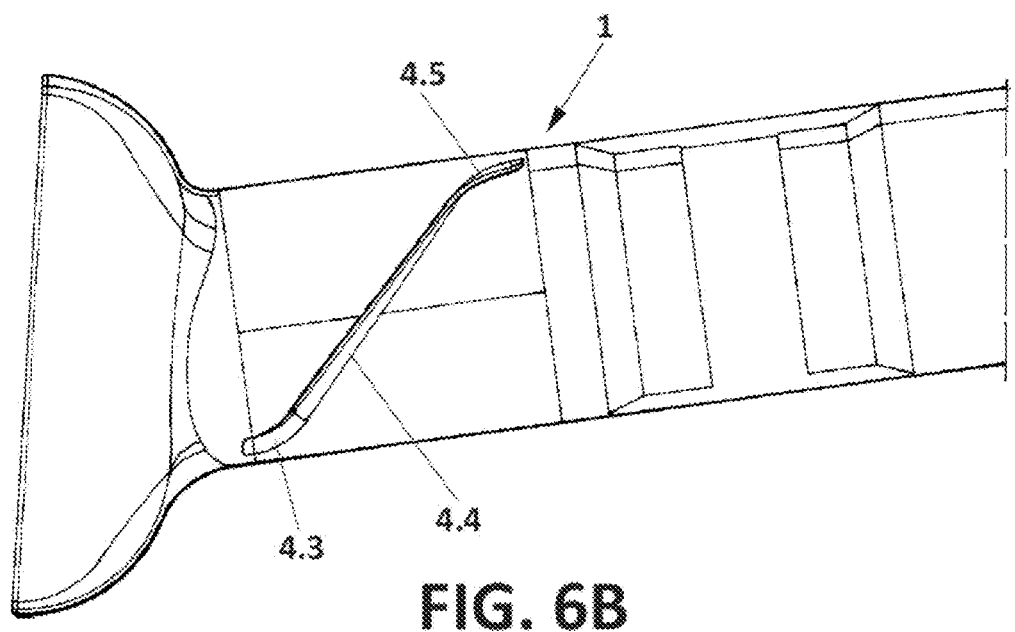
Figure 6C:
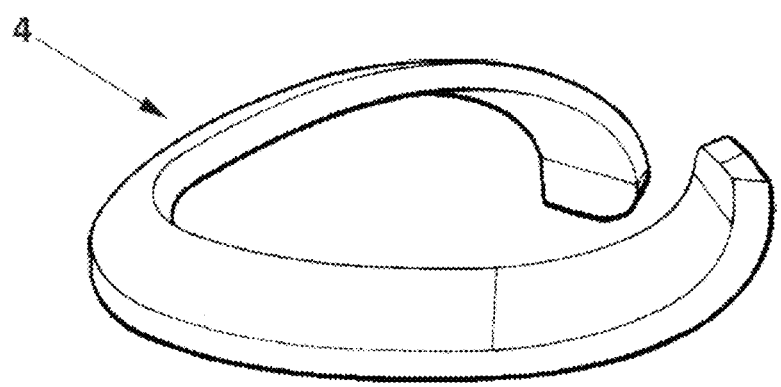

FIGS. 6A-C and 7 show another embodiment of a duct (1) according to the invention. FIGS. 6A-B represent the duct (1) in front and longitudinal section views, respectively. In turn, FIG. 6C shows separately a continuous piece (4, 5) to be arranged inside this duct.

In particular, each of the continuous pieces (4, 5) shown in FIGS. 6A-C is formed by three portions:
a first portion (4.3, 5.3) starting at the first end (4.1, 5.1),
a second portion (4.4, 5.4), and
a third portion (4.5, 5.5) ending at the second end (4.2, 5.2).

It can be observed that first (4.3, 5.3) and third (4.5, 5.5) portions have a different tilting in comparison with the second portion (4.4, 5.4), in regard of the angle formed with the longitudinal axis. In particular, both first (4.3, 5.3) and third (4.5, 5.5) portions are substantially parallel in respect to the longitudinal axis (z-z') of the duct (1).

In a preferred embodiment, the second portion (4.4, 5.4) forms an angle between 30° and 60° with the longitudinal axis (z-z') of the duct (1).

Furthermore, it can be seen the angle formed with respect to the inner wall of by each section of the continuous piece (4, 5). In particular, for a given side of the continuous piece, the angle formed with the internal wall of the duct passes from an acute angle to obtuse along the path of the continuous piece.

Accordingly, the continuous pieces (4, 5) have a torsion along their respective paths, wherein the torsion of each portion varies with respect to the others but keeping a smooth transition. Details of this can be seen in FIG. 6A.

Figure 7:
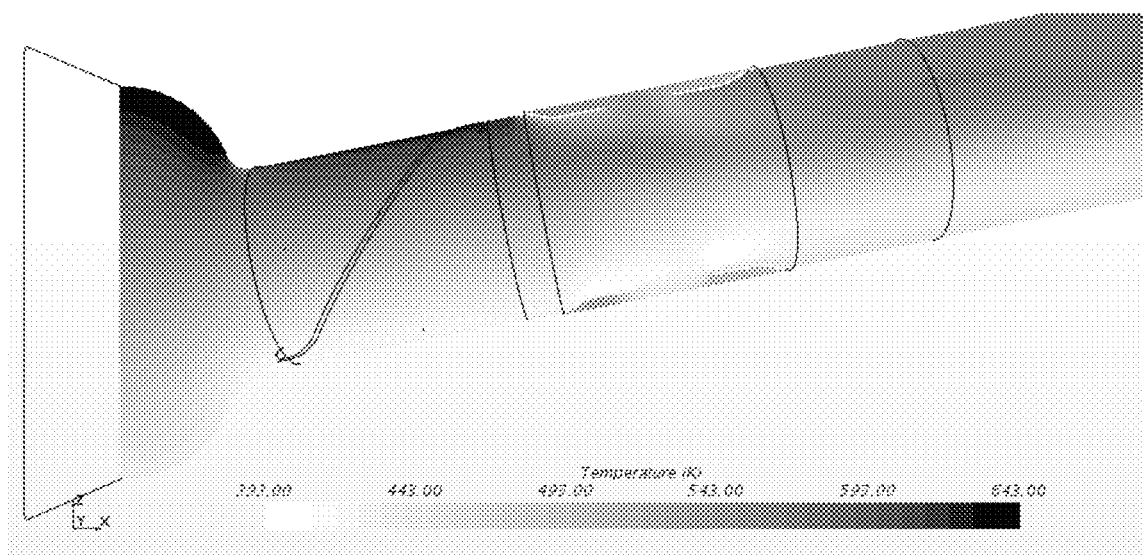
FIG. 7 shows the results of CFD analysis performed for the duct according to the embodiment of FIGS. 6A-C.

FIG. 7 shows the results of CFD analysis performed for the duct (1) according to the embodiment of FIG. 5 with a model under the same conditions as explained in FIGS. 2 and 3A-B.

Figure 8A:
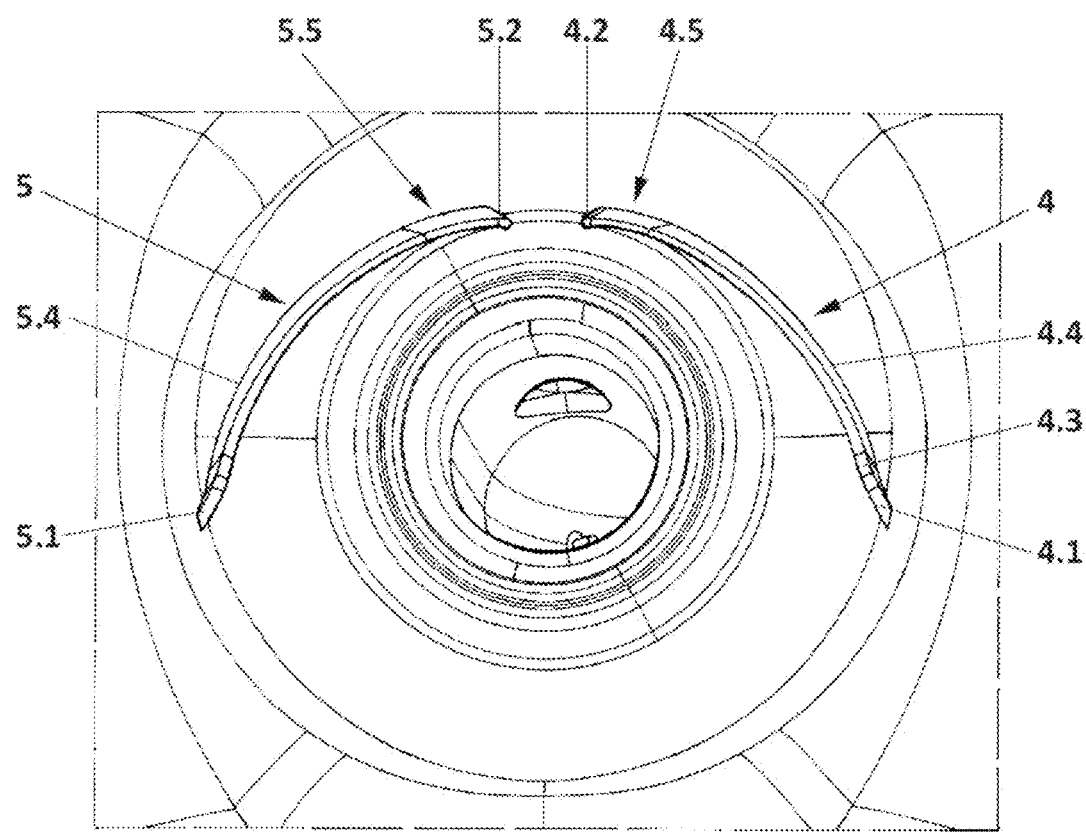
FIGS. 8A-B show yet another embodiment of a duct according to the invention.
Figure 8B:
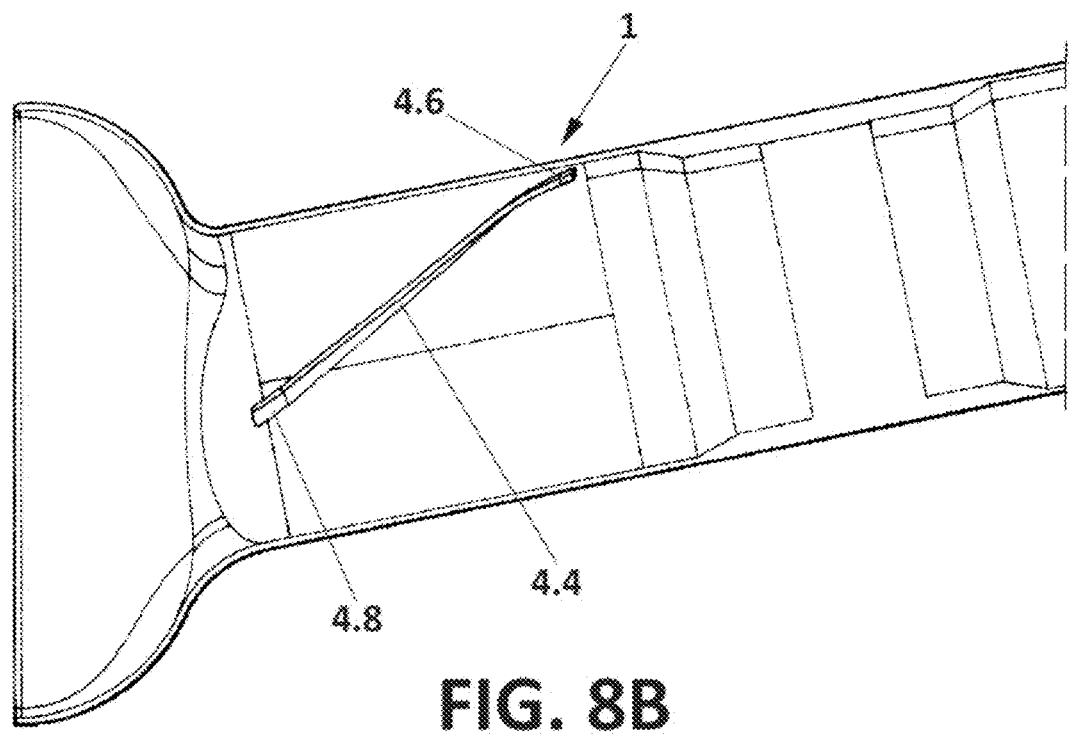
Figure 9:
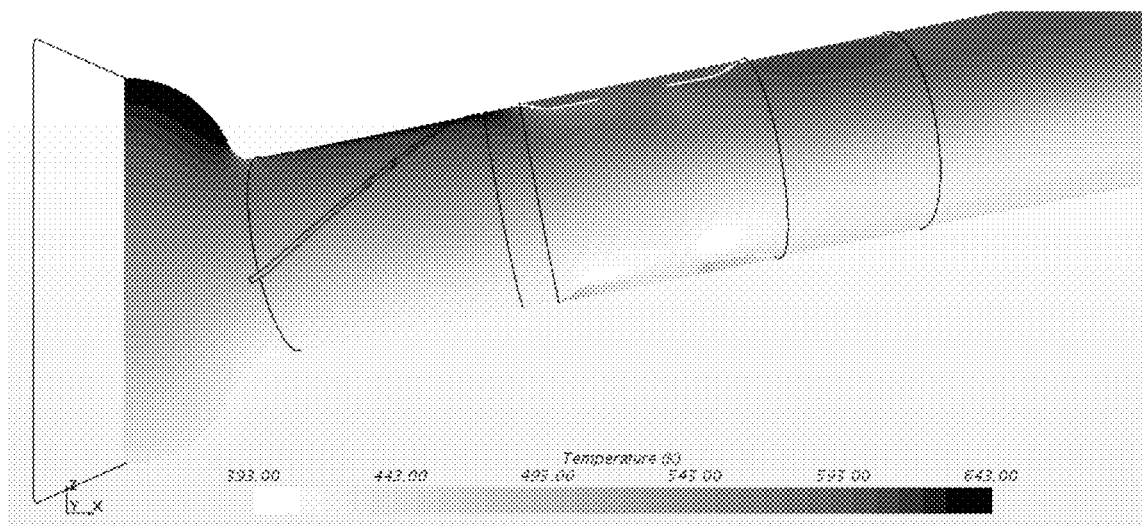
FIG. 9 shows the results of CFD analysis performed for the duct according to the embodiment of FIGS. 8A-B.

A variant of the embodiment of FIGS. 6A-C and 7 is shown through FIGS. 8A-B and 9, wherein the difference with this embodiment is a greater distance between the first ends (4.1, 5.1) of the continuous pieces (4, 5).

Furthermore, the tilting between first (4.3, 5.3) and second (4.4, 5.4) portions are significantly less pronounced than corresponding portions of FIGS. 6A-C, being indeed the first portion (4.3, 5.3) almost parallel to the longitudinal axis (z-z') of the duct (1).

As for FIG. 6A, the continuous piece (4, 5) shown in FIG. 8A is angled (different from 90°) with respect to the inner wall of the duct differently for each of its sections. Nevertheless, smooth transitions between portions of a single continuous piece either in path, or in torsion takes place.

FIG. 9 shows the results of CFD analysis performed for the duct (1) according to the embodiment of FIGS. 8A-B with a model under the same conditions as explained in FIGS. 2 and 3A-B.

Figure 10:
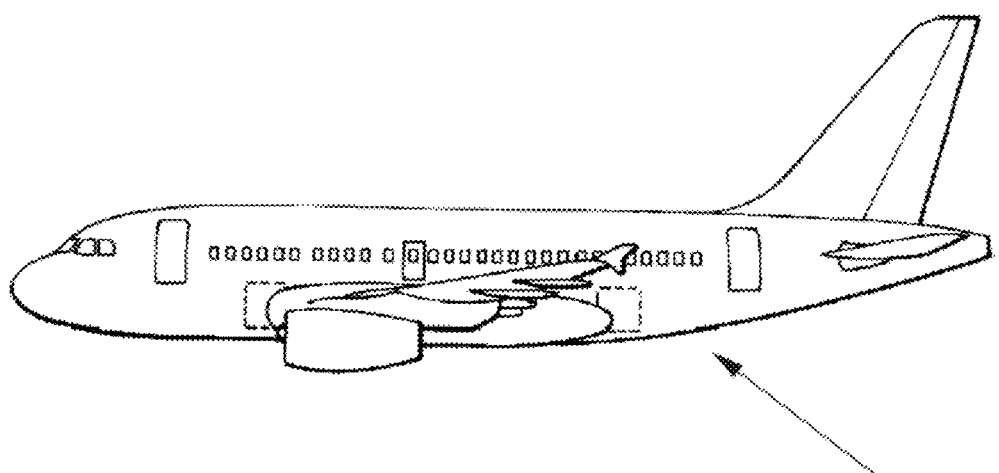
FIG. 10 shows an embodiment of an aircraft according to the invention.

FIG. 10 shows an embodiment of an aircraft according to the invention. The aircraft comprises a bleed system (not shown) that comprises:
a heat exchanger with a cold side and a hot side, the hot side comprising an inlet and an outlet, and the cold side comprising an inlet and an outlet; and
a duct according to the invention;
wherein the hot side outlet is in fluid communication with the inlet section of the duct.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A duct for a bleed system of an aircraft, wherein the duct extends at least partially along a longitudinal axis, the duct comprising:
an inlet section for entering a fluid flow into the duct;
an outlet section, distanced from the inlet section, through which such fluid flow exits the duct; and
at least one continuous piece arranged on an internal wall of the duct and protruding therefrom, the at least one continuous piece having:
a first end located at a position adjacent to the inlet section and
a second end located at a position close to the outlet section,
wherein the at least one continuous piece is slantly extended from the first end to the second end along a direction of the longitudinal axis of the duct so that the first and second ends are substantially opposed in transversal cross-section of the duct,
wherein the at least one continuous piece has three portions:
a first portion starting at the first end of the at least one continuous piece,
a second portion, and
a third portion ending at the second end of the at least one continuous piece,
wherein each of the first portion, the second portion, and the third portion of the at least one continuous piece has a different tilting degree in relation to the longitudinal axis of the duct.

2. The duct according to claim 1, wherein the first and third portions are less tilted in relation to the longitudinal axis of the duct than the second portion.

3. The duct according to claim 1, wherein the first and third portions are substantially parallel to the longitudinal axis of the duct, the second portion forming an angle between 30° and 60° with the longitudinal axis of the duct.

4. The duct according to claim 1, wherein the at least one continuous piece is a substantially elongated thin piece.

5. The duct according to claim 1, wherein the at least one continuous piece is angled with respect to the internal wall of the duct.

6. The duct according to claim 5, wherein an angle between the at least one continuous piece and the internal wall of the duct varies along a path of the at least one continuous piece.

7. The duct according to claim 1, wherein the at least one continuous piece comprises at least two continuous pieces arranged on the internal wall of the duct.

8. The duct according to claim 7, wherein two of the at least two continuous pieces are symmetrically arranged on the internal wall of the duct relative to a middle plane passing through the longitudinal axis from top to bottom of the duct, the first ends of the two continuous pieces being separated a first predetermined distance, and the second ends of the two continuous pieces being separated a second predetermined distance.

9. The duct according to claim 8, wherein the first predetermined distance is greater than the second predetermined distance.

10. The duct according to claim 7, wherein at least two of the at least two continuous pieces are arranged on the internal wall of the duct staggered relative to the axis, each continuous piece starting at a different position along the longitudinal axis.

11. The duct according to claim 1, wherein the duct is substantially cylindrical at least along a portion of the duct.

12. The duct according to claim 11, wherein the at least one continuous piece has a helical profile on the internal wall of the duct.

* * * * *